United States Patent
Ahmad (10) Patent No.: US 7,676,409 B1
(45) Date of Patent: Mar. 9, 2010

(54) METHOD AND SYSTEM FOR EMULATING A PRIVATE LABEL OVER AN OPEN NETWORK

(75) Inventor: Farhan Ahmad, Philadelphia, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 486 days.

(21) Appl. No.: 11/155,663

(22) Filed: Jun. 20, 2005

(51) Int. Cl.
*G06Q 99/00* (2006.01)

(52) U.S. Cl. ...................................................... 705/35

(58) Field of Classification Search .............. 705/35–40
See application file for complete search history.

(56) References Cited

U.S. PATENT DOCUMENTS 3,653,480 A  4/1972  Yamamoto et al.

(Continued)

FOREIGN PATENT DOCUMENTS

EP             0099999        7/1983

(Continued)

OTHER PUBLICATIONS

Robert M. Hunt "An Introduction to the Economics of Payment Card Networks" Review of Network Economics, vol. 2, Issue 2, Jun. 2003.*

(Continued)

*Primary Examiner*—Thu-Thao Havan
*Assistant Examiner*—Thomas M Hammond, III
(74) *Attorney, Agent, or Firm*—Hunton & Williams, LLP (57) ABSTRACT

According to one embodiment, the present invention relates to a method and a system for emulating a private label network over an open network where settlement occurs at varying discount rates with one or more merchants or providers. A computer implemented method and system for settling a transaction at a discount rate may include receiving an authorization record for the transaction initiated by a customer over an open payment network; identifying payment plan data associated with a transaction; creating a settlement record based at least in part on the authorization record and the payment plan data; determining a discount rate for the settlement record; and settling with a provider for the transaction at the discount rate.

22 Claims, 3 Drawing Sheets

U.S. PATENT DOCUMENTS

| | | |
|---|---|---|
| 4,205,780 A | 6/1980 | Burns |
| 4,264,808 A | 4/1981 | Owens et al. |
| 4,321,672 A | 3/1982 | Braun et al. |
| 4,396,985 A | 8/1983 | Ohara |
| 4,495,018 A | 1/1985 | Vohrer |
| 4,617,457 A | 10/1986 | Myers |
| 4,672,377 A | 6/1987 | Murphy |
| 4,700,055 A | 10/1987 | Kashkashian, Jr. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,941,090 A | 7/1990 | McCarthy |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,117,355 A | 5/1992 | McCarthy |
| 5,121,945 A | 6/1992 | Thomson et al. |
| 5,122,950 A | 6/1992 | Mee et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,202,826 A | 4/1993 | McCarthy |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,268 A | 2/1994 | McCarthy |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn et al. |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| RE36,116 E | 2/1999 | McCarthy |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,883,810 A | 3/1999 | Franklin et al. |

| Patent No. | Date | Name |
|---|---|---|
| 5,884,288 A | 3/1999 | Chang |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A * | 5/2000 | Walker et al. ............ 705/38 |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,490,568 B1 | 12/2002 | O'Mara et al. |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,704,714 B1 | 3/2004 | O'Leary et al. |
| 6,721,715 B2 | 4/2004 | Nemzow |
| 6,820,058 B2 * | 11/2004 | Wood et al. ............ 705/4 |
| 6,825,940 B1 | 11/2004 | Wu et al. |
| 6,954,896 B1 | 10/2005 | Dodrill et al. |
| 6,970,259 B1 | 11/2005 | Lunt et al. |
| 7,062,456 B1 | 6/2006 | Riehl et al. |
| 7,104,443 B1 | 9/2006 | Paul et al. |
| 7,177,836 B1 | 2/2007 | German et al. |
| 2001/0018739 A1 | 8/2001 | Anderson et al. |
| 2001/0032139 A1 | 10/2001 | Debonnet, Jr. |
| 2001/0037309 A1 | 11/2001 | Vrain |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 * | 9/2002 | Kawan et al. ............ 705/67 |
| 2002/0138398 A1 | 9/2002 | Kalin et al. |

| | | |
|---|---|---|
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0046218 A1 | 3/2003 | Albanese et al. |
| 2003/0097335 A1 | 5/2003 | Moskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0201735 A1 | 10/2004 | Baron |
| 2004/0228514 A1 | 11/2004 | Houle et al. |
| 2005/0033690 A1 | 2/2005 | Antognini et al. |
| 2005/0177480 A1 | 8/2005 | Huang |

FOREIGN PATENT DOCUMENTS

| | | |
|---|---|---|
| EP | 421808 | 4/1991 |
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Chris West "The Real Scoop About Merchant Account Rates & Fees" Jun. 21, 2004.*
Annual Report Pursuant to Sectin 13 or 15(d) of The Securities Exchange Act of 1934, Form 10-K, Intelidata Technologies Corporation, Fiscal Year Ended Dec. 31, 2001.
Blockbuster running test of a stored value card, The American Banker, Sep. 1, 1995.
CES/NaBANCO introduces stored value card technology blockbuster video is first merchant partner, Business Wire, Inc., Jan. 15, 1996.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments IIIs, The American Banker, vol. 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Dialog file 20, #10279554.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, And Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Dialog file 20, #10279554; Offer: Book Yourself Free Cassettes; Mar. 25, 2000; Birmingham Post, p. 16.
Terrie Miller and Henry Yan, When Custody Governs, Benefits Canada, Toronto, Feb. 1998, vol. 22, Issue 2, p. 33, 5 pages.

* cited by examiner

METHOD AND SYSTEM FOR EMULATING A PRIVATE LABEL OVER AN OPEN NETWORK

FIELD OF THE INVENTION

The present invention relates generally to a private label network and, more particularly, to a method and system for emulating a private label network over an open payment network where settlement occurs at varying discount rates with one or more merchants or providers.

BACKGROUND OF THE INVENTION

The growth and wide acceptance of credit cards have led to greater acceptance at the point of sale, increased availability of affinity and loyalty programs as well as greater convenience and security in making large payments. A credit card transaction typically involves a financial institution issuing a credit card to a consumer where the financial institution lends an amount of funds to the consumer and reduces the consumer's pre-set credit limit by the amount. Interchange is the fee paid by merchants to issuers of the cards. Bankcard interchange fees are calculated by combining a percent of the total sales amount with a fixed fee per transaction. They are collected by the merchant's acquiring banks, and then forwarded to the card issuer's Visa™ or MasterCard™ settlement account. The merchant pays a discount fee of generally 1.5-2%, which includes the interchange fee. The discount fee covers the processing costs from the merchant acquirer and the fee from the bankcard association (Visa™ or MasterCard™). Merchants pay an amount of a basis point spread over the interchange fee for processing services.

Cardholders generally refer to consumers and businesses that have accounts with issuers. Issuers solicit credit card accounts, extend credit, stimulate activity and usage, perform customer service, collect payments, and manage cardholder risk. Merchants may be any business, not-for-profit or government organization engaged in exchanging value via credit cards. Credit sales are settled to a merchant's demand deposit account (DDA) that the merchant has with a commercial bank, also referred to as the merchant bank. Acquirers purchase credit sales from merchants and forward the balances to issuers. In order to do this, an authorization process obtains, transports and routes data to enable authorization and electronic settlement between/among issuers, acquirers, and the bank where the merchant maintains an account to receive cash credit card receipts.

Card associations set the operating rules and enforce them with various constituents in the industry. They also act as a common utility and operate the communications network, the switching and routing function, and certain back-up and stand-in functions, such as authorizations. Card associations are also significantly engaged in globally developing and maintaining brand equity and card acceptance. Almost any function can be out-sourced to third party providers. Usually but not in all cases, the decisioning criteria may be set by an industry client entity and an outsourcer may act as an agent performing functions in accordance with contractual specifications set by the client entity. Such functions may include credit granting; application processing; plastics issuing; accounts receivable processing (e.g., applying entries, computing balances and interest, etc.); statement rendition and mailing; payment processing; authorization processing, switching, and routing; risk management algorithms—application scoring, behavioral scoring, fraud controls; selling merchants; purchasing credit card sales; settlement processing; customer service; and collections, both pre and post write-off.

Discount income is earned from credit sales purchased from retailers. The discount is intended to cover the transaction cost, the cost of financing receivables and as compensation for presenting a merchant with a customer who is creditworthy and eligible to make a purchase with credit. The actual discount charged to the merchant may result from negotiations with the acquirer. The acquirer considers profitability factors, such as business volume, fraud rates, average ticket size, etc. when an offer is made. Generally, an acquirer may have two known pricing components—fees paid to the associations and interchange fee paid to the issuer—and the residual which covers the acquirer's operating expense and profit. The interchange rate may be set by the card association. In practice, interchange varies by type of card—generally these are general purpose credit cards (GPCC), non-revolving cards, and procurement cards. While rates may vary from card to card, the model is substantially similar. Discount income may be typically split three ways: the acquirer retains a portion; a small portion is paid to the card association for services; and a portion, referred to as "interchange" is forwarded to the card issuer.

Merchants generally make a certain margin on the goods and services sold. Full service merchants may have mark-ups of 50% and some discounters may have a mark-up of 27% margin. Credit card transactions are actually the purchase transaction where the discount rates and/or interchange fees may be applied. A discount rate is applied to the credit sale, advancing the net amount after subtracting the discount from the gross sale in accordance with the contract through the acquirer. The discount rate for a GPCC is negotiated between the acquirer and the merchant. For example, a typical GPCC discount rate may be 250 basis points or 2.5%. From the discount rate, the Merchant Processor pays an interchange fee to a Credit Card Issuer, an assessment fee to a Card Association, and the residual is provided to cover the acquirer's operating expense and profit.

Interchange fees may include fees paid by a Merchant via Merchant Acquirer to a credit card issuer, such as Card Issuing Bank, for transactions that are processed through interchange. Interchange may represent a clearing and settlement system where data is exchanged between a Card Association and a Card Issuing Bank. Interchange fees may be set to compensate for risk and operating expenses involved in processing a transaction. Interchange fees vary depending on the type of card presented, how it is processed, the type of merchant accepting the credit card and/or other criteria.

A basic credit card transaction starts with the purchase of a good or service at a merchant with a credit card, which is swiped at a point of sale terminal and the transaction value is entered. The transaction is processed through a card association to the bank that issued the card. Assuming there are funds available under the consumer's credit limit, an authorization is routed back to the merchant through the same network. The approval is routed back to the merchant and the consumer signs the receipt.

Another type of credit card is a retail store credit card, which are credit cards generally issued by retail stores. These cards carry the name or logo of the issuing retail store and typically can only be used at the store that issued the card. Private label programs offer store cards by a third-party entity on behalf of the retailer. Much of the cost of the program comes from the merchant discount, while other fees are derived from the processing of statements and cardholder accounts. Generally, retailers who offer private label benefits also offer financing plans. Typically, larger merchants are able to commit to the one-to-one relationships with financing providers. These merchants can also commit to the required infrastructure, training and financial obligations for the ability to offer the variety of financing plans to customers. However, smaller merchants are unable to offer competing financing plans and/or other benefits due to the lack of funds, infrastructure and other resources.

In view of the foregoing, it would be desirable to provide a method and system for variable settlement with merchants and providers which overcomes the above-described inadequacies and shortcomings.

SUMMARY OF THE INVENTION

According to an exemplary embodiment of the present invention, a computer implemented method for settling a transaction at a discount rate may comprise the steps of receiving an authorization record for a transaction initiated by a customer over an open payment network; identifying payment plan data associated with the transaction; creating a settlement record based at least in part on the authorization record and the payment plan data; determining a discount rate for the settlement record; and settling with a provider for the transaction at the discount rate.

In accordance with other aspects of this exemplary embodiment of the present invention, the method may include the step of funding a settlement account for an amount of the transaction; the step of identifying transaction data for the transaction, wherein the transaction data comprises one or more of provider identity and transaction type, wherein the discount rate is further based on the transaction data; wherein payment plan data comprises one or more financing plans; wherein the payment plan data is selected at a point of sale for the transaction; wherein payment plan data is predetermined by a customer; wherein the payment plan data is determined after the transaction; wherein the discount rate is adjusted after the step of settling; wherein the step of calculating the discount rate is based at least in part on the merchant; wherein the provider is a provider of medical services; wherein the discount rate is calculated for a plurality of transactions; wherein the customer receives a consolidated bill for a plurality of transactions for a plurality of providers; and wherein the open payment network comprises a card association network.

According to an exemplary embodiment of the present invention, a computer implemented system for settling a transaction at a discount rate may comprise an authorization module for receiving an authorization record for a transaction initiated by a customer over an open payment network; a card holder module for identifying payment plan data associated with the transaction; and a settlement module for creating a settlement record based at least in part on the authorization record and the payment plan data; determining a discount rate for the settlement record; and settling with a provider for the transaction at the discount rate.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

An embodiment of the present invention generally relates to offering private label benefits over an open network. Through an embodiment of the present invention, a card issuer or other entity may settle with each merchant (or group of merchants) at a variable discount rate, based on the transaction, a corresponding payment plan and/or other factors. Authorization may be performed using an open payment network, e.g., Visa™, MasterCard™ or other similar payment network. In other words, merchants may participate in a closed loop, private label relationship with customers while experiencing the benefits of an open payment network.

Generally, large merchants have the capability and resources to offer financing options where customers may apply for a private label card for purchasing a large ticket item (e.g., appliance, electronics, etc.). In addition, large merchants have the resources to enter into a relationship with a third party to offer a private label account. However, smaller merchants are unable to offer similar financing options without proprietary software, infrastructure, training, set-up, etc. Oftentimes, the resources are simply not available to smaller merchants. An embodiment of the present invention enables a merchant to offer various financing options to customers, without the infrastructure currently required for private label benefits. For example, a local jewelry store may offer a plurality of financing options for the purchase of jewelry. Thus, the local jewelry store can now offer competing financing options as the well known national jewelry chain.

According to an exemplary embodiment, a credit card (or other identifier, portable device RFID, etc.) may be used at selected or predetermined providers and/or merchants. At the selected or predetermined providers and/or merchants, a customer may participate in a financing plan (e.g., 0% for 12 months, installment plan, etc.) for purchases. Through an embodiment of the present invention, settlement may be performed with each merchant at a variable discount rate.

The applicable discount rate may be based on various factors. For example, the discount rate may be based on transmission amount, transaction type, a predetermined rate or plan selected by the customer or automatically generated by a system, credit history data, merchant identity and/or other information. In addition, the financing plan may be applied to a single expensive purchase or multiple smaller purchases as well as combinations of purchases. In addition, financing options may be applied to a single purchase and/or multiple purchases at a single merchant, affiliated merchants and separate merchants. While the examples illustrate financing options, other payment options may be individually applied to each merchant, provider, groups of merchants and/or groups of providers.

The discount rate may be based on various factors, such as transaction type, customer behavior, merchant considerations and/or other combination of factors. For example, the discount rate may be specific for a transaction. In this example, a jewelry store may offer a special financing plan for purchases over a predetermined amount (e.g., high end purchases). In this example, the jewelry store may offer 10% down with 0% financing for purchase of an engagement ring.

According to another example, the discount rate may be based on the customer. For example, the customer's credit history, transaction history, payment data and/or other behavior data may indicate that the customer has a high credit worthiness. Therefore, the discount rate may be based on the customer's apparent ability to pay. According to another example, the discount rate may be defined by the merchant. In this example, the merchant may offer a special payment plan during the holiday season to generate more business during gift giving opportunities. For example, the merchant may offer a promotion discount for Mother's Day. In addition, the discount rate may be based on combination of criteria. For example, the merchant may offer a promotional financing plan for the holiday season and further adjust the financing plan based on the customer's credit history data. The merchant may offer different financing plans to different customers for different types of merchandise, etc. In addition, the timing of the purchase (e.g., holiday, customer's birthday, etc.) may also affect the applicable discount rate.

Figure 1:
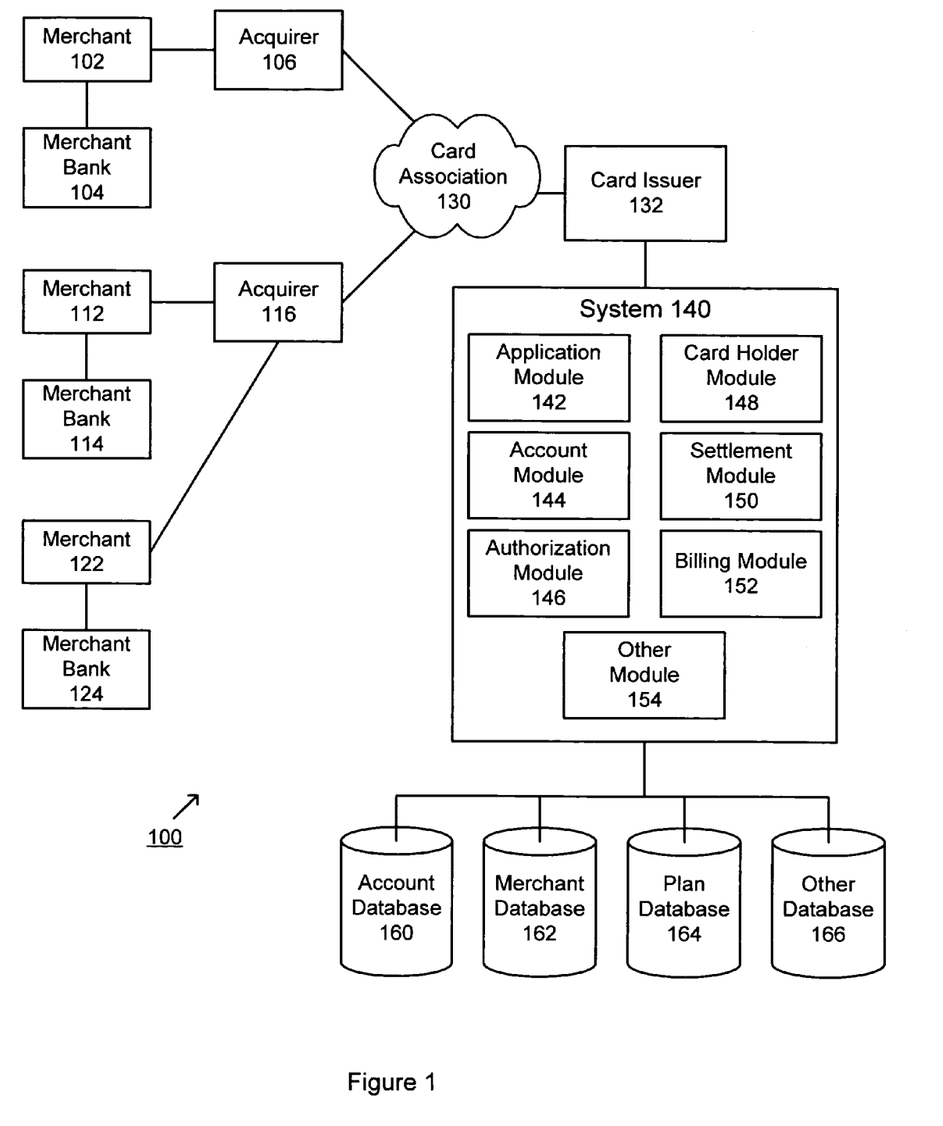
FIG. 1 is a diagram of an exemplary system for transaction authorization, according to an embodiment of the present invention.

FIG. 1 is a diagram of an exemplary system for transaction authorization, according to an embodiment of the present invention. Merchant 102 may have an associated Merchant Bank 104. Similarly, Merchant 112 may have an associated Merchant Bank 114 and Merchant 122 may have an associated Merchant Bank 124. When a customer makes a purchase with a card product, a merchant may communicate transaction data related to the purchase to an acquirer, such as Acquirer 106, 116. The customer may make the purchase at a point of sale where the customer physically hands the card product to the merchant. In another example, the customer may make the purchase over the Internet, via phone order and/or other form of purchase method. Further, the card product may be a conventional plastic credit card, RFID, token, card number, card identifier, portable device (e.g., cell phone, PDA, etc.), and/or other device or identifier. Transaction data may be conveyed to Card Association 130. Transaction data may be forwarded to Card Issuer 132 for authorization.

System 140 may be combined with or separate from Card Issuer 132. System 140 may include modules for providing functionality associated with authorization and settlement, according to the various embodiments of the present invention. For example, System 140 may include Application Module 142, Account Module 144, Authorization Module 146, Card Holder Module 148, Settlement Module 150, Billing Module 152 and/or Other Module 154. The modules may be further duplicated, combined and/or separated across multiple systems at local and/or remote locations. The various modules of System 140 may access, communicate, manipulate and/or store data at various sources, including one or more databases.

Databases may include account database 160, merchant database 162, plan database 164 and other database 166. Account database 160 may store account information for customers, including customer preference data. Merchant database 162 may store merchant data, merchant specific promotions, etc. Plan database 164 may include payment plan data, financing plan data and/or other data, which may be customized for each customer. Merchants may also customize various financing plans for their customers, through an interface or other mode of communication. Third party providers may also offer customized financing plans. Other sources of information may also be accessed by the various modules and/or participants of system 100. The databases may be further combined and/or separated. The components of FIG. 1 may be duplicated, combined, separated and/or otherwise modified, as desired by various applications of the embodiments of the present invention as well as different purchasing environments and platforms.

Application Module 142 may receive applications from customers for a card product (or other identifier) of an embodiment of the present invention. Customers may apply for the card product of an embodiment of the present invention through various communication methods. For example, customers may apply on-line, at the point of sale, phone, mail, etc. Customers may provide identification information (e.g., name, address, etc.), preference data (e.g., payment method, notification, etc.) and/or other data. Application Module 142 may also verify credit data and/or other data. Customer financial information may be accessed to verify eligibility to participate in an embodiment of the present invention. For example, a customer's credit history may be examined as part of an approval process. In addition, the customer may be pre-approved in advance.

The application process may occur at the point of sale, prior to purchase transactions, after purchases are made, and/or other time period. For example, a customer may purchase an entertainment center at an electronics store. At the point of sale, the customer may be offered an attractive financing plan. The customer may apply for the plan. Upon approval (or pending approval), the customer may charge the entertainment plant to the newly established account. In another example, the application process may occur prior to the transaction. For example, the customer may apply for a card product of an embodiment of the present invention through an online interface or other form of communication (e.g., phone, mail, in-person, etc.) prior to making purchases. The customer may also apply for financing plans retroactively where the financing plan may be applied to one or more past purchases.

Account Module 144 may create and maintain an account for each customer or entity. Each account may have an identifier that may correspond to the card identifier number. Account Module 144 may maintain account data, which may include transaction data, purchase data, and/or other data. According to an embodiment of the present invention, one or more merchants (or providers) may be pre-selected and associated with the card product. The customer may select one or more merchants and/or service providers. The customer may also select a type of merchant (e.g., electronics store, etc.) or enter other criteria where the system may automatically generate a list of participating merchants and/or service providers. For example, a customer may identify a watch store, electronic store and travel agency as eligible merchants (or providers). A customer may also identify a group of merchants, such as furniture stores, where the system may generate a list of eligible furniture store vendors. Thus, the customer may purchase goods and/or services from these pre-selected merchants and participate in various financing plans, which may be specific to each merchant.

According to an aspect of the present invention, a plurality of merchants may create a network of merchants for collectively and/or individually offering private label network benefits to the various customers. For example, a group of merchants may agree to be affiliated and to further be identified by an identifying mark (e.g., logo, mark, symbol, slogan, etc.). Therefore, customers may recognize financing eligibility through the identifying mark, which may be displayed at the merchant location, website and/or other venue or display.

The card product of an embodiment of the present invention may be used at one or more merchants, where a separate account may be maintained for each merchant. According to another example, the purchases from multiple merchants may be applied to a single account. For example, Account Module 144 may maintain history data where a system of an embodiment of the present invention may offer card features and/or benefits to customers based on recent transactions. For example, a customer may receive offers for rewards, promotions and/or other services based on customer spending behavior. For example, account data may reveal that the customer prefers shopping at a particular shoe store. The shoe store owner may offer a 10% off coupon for the next purchase of shoes at that store. Other benefits from various other sources may be offered. Account data may also reveal that the customer is having difficulty making payments, the system may offer a refinancing option to lower the monthly payments. The refinancing option may negotiate a lower interest rate, consolidate payments, adjust monthly payment amount and/or offer other payment options. Refinancing options may be applied to some or all purchases and/or accounts.

At the point of sale, the customer may also select a plan for a transaction involving one or more merchants (or providers). In addition, the plan may be selected at other time periods (e.g., prior to the sale, after the sale, etc.) The plan may include a financing option, payment plan, etc. For example, a merchant may offer customers 0% for 12 months and agree to pay the Bank 10% of the transaction. Customer may select a different plan for each merchant, transaction, etc. For example, a bank (or other financial entity) may settle with a merchant at a discount rate (e.g., 10%) and settle with a card association (e.g., Visa™, MasterCard™) and/or an acquirer at respective processing rates or fees. For an exemplary $100 transaction, the merchant may receive a 10% discount, the card association may receive $0.05 and the acquirer may receive $0.02 for the transaction.

Authorization Module 146 may authorize transactions made by the customer at various merchants and/or other service providers. Authorization Module 146 may receive authorization requests for transactions from various merchants. Authorization Module 146 may verify purchase eligibility for the transaction. Once the purchase is authorized, an authorization message may be sent to Card Association 130, which in turn may send the authorization to Acquirer and then to the participating merchant. Upon receipt of the authorization message, the merchant may complete the transaction with the customer. Authorization Module 146 may forward the authorized transactions for settlement to Card Holder Module 148.

Card Holder Module 148 may receive the authorized transactions. Card Holder Module 148 may associate the authorized transactions with a corresponding plan which may include a financing plan, a payment plan, etc. Card Holder Module 148 may forward the authorized transaction and corresponding plan to Settlement Module 150.

Settlement Module 150 may receive the authorized transaction and corresponding plan and create a settlement record for processing. Settlement Module 150 may append data to the authorized transaction to create a new settlement record and settle with one or more merchants at different discount rates. Based at least in part on the corresponding plan, Settlement Module 150 may calculate an appropriate discount fee for settlement with a participating merchant (or provider) or group of merchants (or providers). An appropriate merchant settlement account may then be funded for the amount of the transaction. According to an exemplary embodiment, settlement may be made directly with the merchant, with the appended settlement record. Different discount rates may be applied to different merchants, transactions, etc. The appended settlement record may be used to settle with each independent provider bank or other settlement entity. The discount rates may be further adjusted and/or modified. For example, the customer may elect to refinance one or more transactions at a lower interest rate. In addition, the customer may combine past purchases with current purchases when invoking a new payment plan.

Billing Module 152 may generate and send bills and/or other statements to the customer based on the transactions made with the card product. The bills may be separate for each merchant or combined as a total bill. Refinancing options may be applied to the bill, for some or all purchases. For example, a customer may receive a single consolidated bill for purchases at a watch store, electronics store and travel agency. Each merchant may enroll the customer in different financing plans. In addition, individual purchases may involve different financing plans, even purchases made at the same merchant. Refinancing options may allow a customer to consolidate some or all plans into a single installment plan. Other options may also be available.

An embodiment of the present invention may be applied to merchants, particularly for large ticket items (e.g., jewelry, appliances, electronics, furniture, travel, etc.). According to another example, variable discount rates may be applied to providers, such as medical service providers (e.g., doctors, hospitals, pharmacies, etc.). Medical procedures (e.g., surgeries, etc.) are generally expensive, even with assistance from insurance. Oftentimes, customers may need to finance some or all of the payment. In addition, unlike merchandise purchases, medical procedures may be a necessity where financing is more urgent and often difficult to negotiate. An embodiment of the present invention simplifies and expedites the financing of such medical procedures. According to an example, a medical procedure, such as laser eye surgery, may be financed through an embodiment of the present invention where financing is offered at a medical facility.

The various embodiments of the present invention offer flexibility and negotiation capabilities between a bank (or other financial entity) and a merchant (or other provider) where various financing options may be pre-negotiated (e.g., 0% for 12 months, 0% for 6 months, 0% for 18 months, installment loan, etc.). Another embodiment may include negotiating the financing options at the point of sale, based on the customer's risk, credit worthiness and/or other factors. In addition, financing options may be determined after the purchases are made. The terms of the financing options may be controlled by the merchant, bank, customer and/or other participant or combination thereof.

Figure 2:
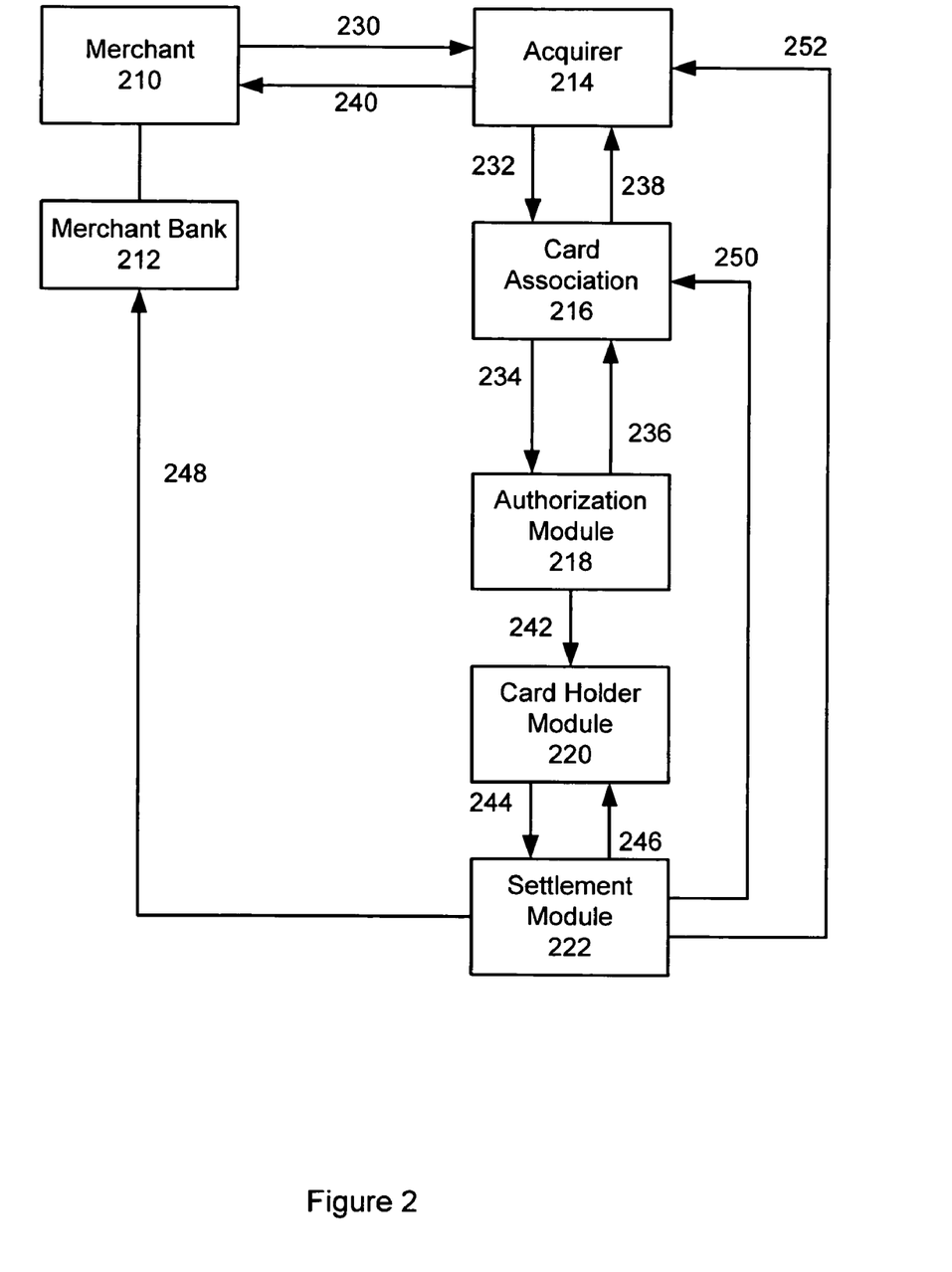
FIG. 2 is an exemplary flowchart for settling with a merchant at variable discount rates, according to an embodiment of the present invention.

FIG. 2 is an exemplary flowchart for settling with a merchant at variable discount rates, according to an embodiment of the present invention. Merchant 210 may have an associated Merchant Bank 212. Merchant 210 may represent a service provider or other entity. Merchant 210 may also represent medical providers and/or other provider of services or goods. A customer may purchase a good, service and/or other product from Merchant 210. Merchant 210 may forward an authorization request for a transaction to Acquirer 214, as shown by 230. Acquirer 214 may forward the authorization request to Card Association 216, as shown by 232. Card Association 216 may forward the authorization request to Authorization Module 218 for authorization, as shown by 234. Once the transaction is authorized, authorization acknowledgement may be sent to Card Association 216, as shown by 236. Card Association 216 may convey the authorization acknowledgement to Acquirer 214, as shown by 238. Acquirer 214 may forward the authorization acknowledgement to Merchant 210, as shown by 240. Merchant 210 may then release the good, service and/or other product purchased by Customer.

Authorization Module 218 may forward the authorized transaction to Card Holder Module 220 for settlement, as shown by 242. Card Holder Module 220 may associate the authorized transaction and a plan, which may be selected by the cardholder in advance, at the point of sale and/or other time period, and forward the information to Settlement Module 222, as shown by 244. The plan may represent a financing plan, payment plan and/or other plan. Settlement Module 222 may append data to the authorized transaction to create an appended settlement record. The appended data may include transaction data, plan data and/or other information. Settlement Module 222 may then forward the settlement record as a settlement file to Card Holder Module 220 for interchange processing, as shown by 246. In addition, Settlement Module 222 may calculate a discount rate (or fee) and settle with the Merchant at the calculated discount rate, as shown by 248. The discount rate may represent the plan associated with the transaction. Through an embodiment of the present invention, settlement may occur directly with a merchant at a variable discount rate. The discount rate may be specific for a transaction, type of purchase, merchant and/or other factor. In addition, the discount rate may consider the customer's credit worthiness. Other factors may affect or adjust the discount rate. According to another example, the discount rate may be adjusted or negotiated at a later time. For example, a merchant may offer a better interest rate to past purchases to promote customer loyalty. A transaction amount may then be funded to a merchant account at Merchant Bank 212. In addition, Settlement Module 222 may calculate a processing fee for Card Association 216 and Acquirer 214, via 250 and 252, respectively. For an exemplary $100 transaction, the merchant may receive a 10% discount, as shown by 248, the card association may receive $0.05, as shown by 250, and the acquirer may receive $0.02, as shown by 252. According to an exemplary scenario, the modules 218, 220 and 222 may be affiliated or combined in a single system or multiple systems.

Figure 3:
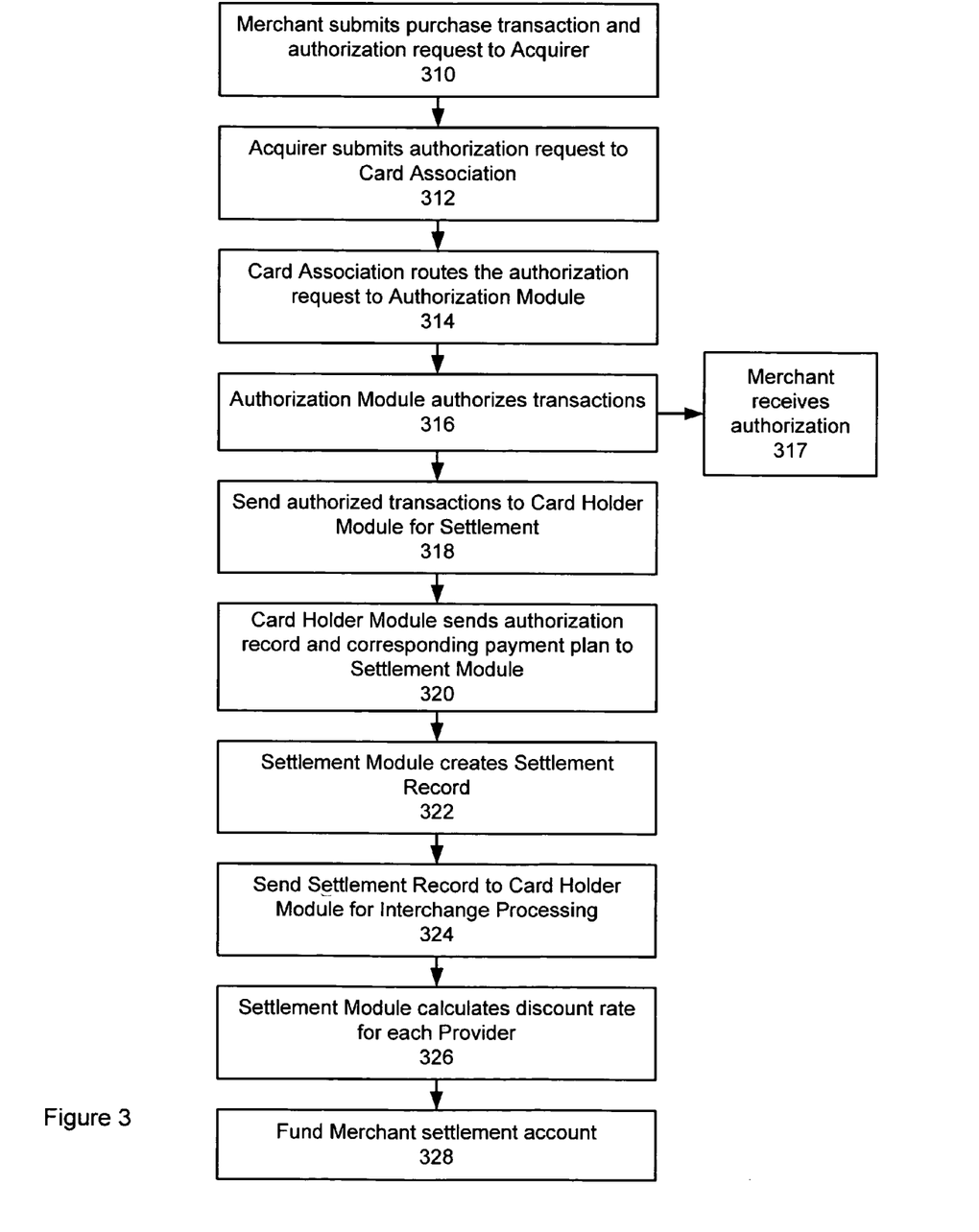
FIG. 3 is an exemplary flowchart illustrating a method for account settlement at variable discount rates, according to an embodiment of the present invention.

FIG. 3 is an exemplary flowchart illustrating a method for account settlement at variable discount rates, according to an embodiment of the present invention. A merchant or other provider may receive a purchase request for a transaction from a customer at a point of sale, which may be in person, via Internet, mail, phone order or other form of purchase. At step 310, the merchant or other provider may submit an authorization request for the transaction to an Acquirer. At step 312, the Acquirer may submit the authorization request to a Card Association. At step 314, the Card Association may route the authorization request to an Authorization Module, which may be separate from or combined with a Card Issuer, e.g., a bank. At step 316, Authorization Module may authorize the transaction in response to the authorization request. At step 317, the merchant may receive authorization for the transaction through regular channels, which may involve the Card Association, the Acquirer and/or other entity or process. At step 318, an authorization record representing the authorized transaction may be forwarded to a Card Holder Module for settlement. At step 320, the Card Holder Module may send the authorization record and a corresponding plan to a Settlement Module. The corresponding plan may include a financing plan, payment plan or other plan associated with the transaction. At step 322, Settlement Module may append data to the authorization record to create a settlement record. The appended data may include data representing the corresponding plan or other information. At step 324, the settlement record in a settlement file may be forwarded to Card Holder Module for interchange processing. At step 326, Settlement Module may calculate a discount rate for settlement with the Merchant. At step 328, a settlement account associated with the Merchant's bank may be funded.

According to another embodiment of the present invention, payment for a transaction may be split between or among multiple payment plans. For example, financing a transaction may be split into two or more financing options. In this example, part of the amount of the transaction may be financed through a private label account while the remaining amount may be financed through a general credit card or other account. In addition, multiple private label accounts may finance a single transaction. Other variations involving multiple financing plans may be realized. Thus, a customer may divide a transaction amount into multiple plans. The multiple plans may be identified by a customer, merchant, financial institution and/or other entity. Further, the multiple plans may be determined automatically by an embodiment of the system of the present invention. Other variations may be realized.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. An automated computer implemented method for settling a transaction at a variable discount rate, wherein the method is executed by a programmed computer processor which communicates with a user via a network, the method comprising the steps of:

receiving an authorization record via the network for a transaction initiated by a customer over an open payment network, wherein the open payment network comprises a card association and a card acquirer;

identifying payment plan data associated with the transaction and specific to a merchant, using the programmed computer processor, wherein the payment plan data comprises data associated with one or more financing plans to finance the transaction;

creating a settlement record based at least in part on the authorization record and the payment plan data, using the programmed computer processor;

applying a discount rate for the settlement record wherein the discount rate is a variable discount rate based at least in part on a combination of transaction type, transaction amount, customer ability to pay and the identified payment plan data, using the programmed computer processor; and settling with the merchant for the transaction at the variable discount rate, wherein the variable discount rate comprises at least a variable percentage rate of an amount of the transaction which is charged to the merchant by one or more of the card association and the card acquirer for processing the transaction.

2. The method of claim 1, further comprising the step of:
funding a settlement account for an amount of the transaction.

3. The method of claim 1, further comprising the step of:
identifying transaction data for the transaction, wherein the transaction data comprises one or more of merchant identity and transaction type, wherein the discount rate is further based on the transaction data.

4. The method of claim 1, wherein the payment plan data is selected at a point of sale for the transaction.

5. The method of claim 1, wherein payment plan data is predetermined by a customer.

6. The method of claim 1, wherein the payment plan data is determined after the transaction.

7. The method of claim 1, wherein the discount rate is adjusted after the step of settling.

8. The method of claim 1, wherein the merchant is a provider of medical services.

9. The method of claim 1, wherein the discount rate is calculated for a plurality of transactions.

10. The method of claim 1, wherein the customer receives a consolidated bill for a plurality of transactions for a plurality of providers.

11. A computer implemented system for settling a transaction at a discount rate, the system comprising:
   a processor;
   an authorization module for receiving an authorization record for a transaction initiated by a customer over an open payment network, wherein the open payment network comprises a card association and a card acquirer;
   a card holder module for identifying payment plan data associated with the transaction and specific to a merchant, wherein the payment plan data comprises data associated with one or more financing plans to finance the transaction; and
   a settlement module for:
      creating a settlement record based at least in part on the authorization record and the payment plan data;
      applying a discount rate for the settlement record wherein the discount rate is a variable discount rate based at least in part on a combination of transaction type, transaction amount, customer ability to pay and the identified payment plan data; and
      settling with the merchant for the transaction at the variable discount rate, wherein the variable discount rate comprises at least a variable percentage rate of an amount of the transaction which is charged to the merchant by one or more of the card association and the card acquirer for processing the transaction;
   wherein the processor, the authorization module, the card holder module and the settlement module are interoperably connected.

12. The system of claim 11, wherein a settlement account is funded for an amount of the transaction.

13. The system of claim 11, wherein transaction data for the transaction is identified, wherein the transaction data comprises one or more of merchant identity and transaction type, wherein the discount rate is further based on the transaction data.

14. The system of claim 11, wherein the payment plan data is selected at a point of sale for the transaction.

15. The system of claim 11, wherein payment plan data is predetermined by a customer.

16. The system of claim 11, wherein the payment plan data is determined after the transaction.

17. The system of claim 11, wherein the discount rate is adjusted after the step of settling.

18. The system of claim 11, wherein the merchant is a provider of medical services.

19. The system of claim 11, wherein the discount rate is calculated for a plurality of transactions.

20. The system of claim 11, wherein the customer receives a consolidated bill for a plurality of transactions for a plurality of providers.

21. An automated computer implemented method for settling a transaction at a variable discount rate, wherein the method is executed by a programmed computer processor which communicates with a user via a network, the method comprising the steps of:
   receiving an authorization record for a transaction initiated by a customer over an open payment network, wherein the open payment network comprises a card association network;
   identifying payment plan data associated with the transaction and specific to a merchant, wherein payment plan data comprises data associated with one or more financing plans to finance the transaction;
   creating a settlement record based at least in part on the authorization record and the payment plan data;
   identifying transaction data for the transaction, wherein the transaction data comprises one or more of provider identity and transaction type;
   applying a discount rate for the settlement record, wherein the discount rate is further based at least in part on a combination of the transaction data, transaction amount, customer ability to pay and the identified payment plan data;
   settling with a provider for the transaction at the discount rate, wherein the discount rate comprises at least a variable percentage rate of an amount of the transaction which is charged to the merchant by one or more of the card association and the card acquirer for processing the transaction; and
   funding a settlement account for an amount of the transaction.

22. A computer implemented system for settling a transaction at a variable discount rate, the system comprising:
   a processor;
   an authorization module for receiving an authorization record for a transaction initiated by a customer over an open payment network, wherein the open payment network comprises a card association network;
   a card holder module for identifying payment plan data associated with the transaction and specific to a merchant, wherein payment plan data comprises data associated with one or more financing plans to finance the transaction;
   a settlement module for:
      creating a settlement record based at least in part on the authorization record and the payment plan data;
      identifying transaction data for the transaction, wherein the transaction data comprises one or more of provider identity and transaction type;
      applying a discount rate for the settlement record, wherein the discount rate is further based at least in part on a combination of the transaction data, transaction amount, customer ability to pay and the identified payment plan data;
      settling with a provider for the transaction at the discount rate, wherein the discount rate comprises at least a variable percentage rate of an amount of the transaction which is charged to the merchant by one or more of the card association and the card acquirer for processing the transaction; and
      funding a settlement account for an amount of the transaction;
   wherein the processor, the authorization module, the card holder module and the settlement module are interoperably connected.

* * * * *